(12) United States Patent  
Gorokhov et al.

(10) Patent No.: US 9,413,481 B2
(45) Date of Patent: Aug. 9, 2016

(54) CDMA WIRELESS COMMUNICATION SYSTEMS

(71) Applicant: QUALCOMM Incorporated, San Diego, CA (US)

(72) Inventors: Alexei Gorokhov, San Diego, CA (US); Aamod Khandekar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/157,998

(22) Filed: Jan. 17, 2014

(65) Prior Publication Data

US 2014/0133467 A1 May 15, 2014

Related U.S. Application Data

(63) Continuation of application No. 11/845,737, filed on Aug. 27, 2007, now Pat. No. 8,638,712.

(60) Provisional application No. 60/840,109, filed on Aug. 25, 2006, provisional application No. 60/841,360, filed on Aug. 30, 2006, provisional application No. 60/828,823, filed on Oct. 10, 2006.

(51) Int. Cl.
*H04B 7/216* (2006.01)
*H04J 13/00* (2011.01)
*H04W 72/04* (2009.01)

(52) U.S. Cl.
CPC .............. *H04J 13/0003* (2013.01); *H04J 13/00* (2013.01); *H04W 72/0406* (2013.01); *H04B 2201/70701* (2013.01); *Y02B 60/50* (2013.01)

(58) Field of Classification Search
CPC .. H04W 52/32; H04W 52/325; H04B 1/1653; H04B 1/76; H04B 3/10; H04B 7/0421; H04L 27/2675; H04L 27/2613; H04L 27/3455; H04L 27/3836
See application file for complete search history.

(56) References Cited

U.S. PATENT DOCUMENTS 6,490,263 B2  12/2002  Kitade et al.
6,671,266 B1  12/2003  Moon et al.
(Continued)

FOREIGN PATENT DOCUMENTS

CN  1748383 A  3/2006
EP  0957604 A1  11/1999
(Continued)

OTHER PUBLICATIONS

ETSI TS 125 213 V4.2.0, "Universal Mobile Telecommunication System (UMTS): Spreading and modulation (FDD)," Dec. 2001.
(Continued)

*Primary Examiner* — Alvin Zhu
(74) *Attorney, Agent, or Firm* — Michael J. DeHaemer, Jr.

(57) ABSTRACT

In a communication system wherein a CDMA segment at each access point consists of multiple sub-segments a three frame transmission time interval (TTI) with eight retransmissions is utilized for data transmission. The access point not only specifies the interlaces to be utilized for data transmission it also assigns packet start interlaces for particular access terminals. An auxiliary pilot channel R-AuxPICH is transmitted by an access terminal along with CDMA data on reverse link. The ratio of R-AuxPICH to R-PICH is varied based on ACK/NACK feedback. A reverse link activity bit (RAB) which can be used as an emergency load-control mechanism for non-QoS flows is also disclosed.

20 Claims, 10 Drawing Sheets

(56) References Cited

U.S. PATENT DOCUMENTS

| | | |
|---|---|---|
| 6,958,989 B1 | 10/2005 | Dick et al. |
| 6,970,437 B2 | 11/2005 | Lott et al. |
| 7,058,124 B2 | 6/2006 | Koo |
| 7,158,556 B2 | 1/2007 | Tiedemann et al. |
| 7,356,006 B2 | 4/2008 | Han et al. |
| 7,587,660 B2 | 9/2009 | Dyer et al. |
| 8,638,712 B2 | 1/2014 | Khandekar et al. |
| 2002/0067774 A1 | 6/2002 | Razoumov et al. |
| 2002/0172217 A1 | 11/2002 | Kadaba et al. |
| 2003/0095498 A1 | 5/2003 | Sato et al. |
| 2003/0124988 A1 | 7/2003 | Bae et al. |
| 2003/0202500 A1 | 10/2003 | Ha et al. |
| 2004/0176042 A1 | 9/2004 | Lott et al. |
| 2004/0246924 A1 | 12/2004 | Lundby et al. |
| 2005/0030926 A1 | 2/2005 | Qian et al. |
| 2005/0063455 A1 | 3/2005 | Tomerlin et al. |
| 2005/0165949 A1 | 7/2005 | Teague |
| 2006/0018365 A1 | 1/2006 | Jung et al. |
| 2006/0067292 A1 | 3/2006 | Ong et al. |
| 2006/0133455 A1 | 6/2006 | Agrawal et al. |
| 2006/0141935 A1 | 6/2006 | Hou et al. |
| 2006/0233110 A1 | 10/2006 | Yang et al. |
| 2007/0049211 A1 | 3/2007 | Rensburg et al. |
| 2007/0165704 A1 | 7/2007 | Yang et al. |
| 2007/0173275 A1 | 7/2007 | Das et al. |
| 2008/0119183 A1 | 5/2008 | Kono |
| 2009/0168683 A1 | 7/2009 | Franceschini et al. |
| 2010/0015986 A1 | 1/2010 | Kono |

FOREIGN PATENT DOCUMENTS

| | | |
|---|---|---|
| EP | 1626514 A1 | 2/2006 |
| JP | 2006042150 A | 2/2006 |
| JP | 2007174045 A | 7/2007 |
| JP | 2008526139 A | 7/2008 |
| JP | 2009524284 A | 6/2009 |
| RU | 2267225 | 12/2005 |
| WO | WO-2007087145 A2 | 8/2007 |

OTHER PUBLICATIONS

International Search Report—PCT/US07/076929, International Search Authority—European Patent Office—Apr. 25, 2008.

International Search Report—PCT/US07/076929, International Search Authority—European Patent Office, Sep. 10, 2008.

Pil Kwan Kim et al.: "An OFDM-CDMA scheme using orthogonal code multiplexing and its parallel interference cancellation receiver" Spread Spectrum Techniques and Applications, 2002 IEEE Seventh International Symposium on Sep. 2-5, 2002, Piscataway, NJ, US, IEEE, vol. 2, (Sep. 2, 2002), pp. 368-372, XP010615493; ISBN: 0-7803-7627-7.

Taiwan Search Report—TW096131965—TIPO—Mar. 28, 2011.

Tomcik T., "QTDD Performance Report 2," IEEE C802.20-05/88, IEEE 802.20 Working Group on Mobile Broadband WIreless Access, <http://ieee802.org/20/>, pp. 1-56, XP002386798 (Nov. 15, 2005).

Universal Mobile Telecommunications System (UMTS) Spreading and Modulation (FDD) (3G TS 25.213 Version 3.2.0 Release 1999) ETSI TS 125 213 V3.2.0, Mar. 2000, pages 1-27, XP002203809

Written Opinion—PCT/US07/076929, International Search Authority—European Patent Office, Sep. 10, 2008.

Yoon U., et al., "Performance Analysis of Multiple Rejects ARQ at RLC (Radio Link Control) for Packet Data Service in W-CDMA System," Globecom'00. 2000 IEEE Global Telecommunications Conference, San Francisco, CA, Nov. 27-Dec. 1, 2000, vol. 1, Nov. 27, 2000, pp. 48-52.

CDMA WIRELESS COMMUNICATION SYSTEMS

CROSS-REFERENCE TO RELATED APPLICATION(S)

This application is a continuation of patent application Ser. No. 11/845,737 filed Aug. 27, 2007, which claims the benefit of U.S. Provisional Patent Applications Ser. No. 60/840,109 filed on Aug. 25, 2006 entitled "CDMA WIRELESS COMMUNICATION SYSTEMS", Ser. No. 60/841,360 filed on Aug. 30, 2006 entitled, "CDMA WIRELESS COMMUNICATION SYSTEMS", and Ser. No. 60/828,823 filed Oct. 10, 2006, entitled, "CDMA WIRELESS COMMUNICATION SYSTEMS," the entireties of these applications incorporated herein by reference.

BACKGROUND OF THE INVENTION

The present document generally relates to various aspect of CDMA traffic design within wireless communication systems.

Wireless communication systems are widely deployed to provide to provide various types of communications such as voice, data, video and so on. These systems may be multiple-access systems capable of supporting communication with multiple access terminals by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems or hybrids involving at least two of these systems. Typically, a wireless communication system comprises several base stations, wherein each base station communicates with the mobile station using a forward link and each mobile station (or access terminal) communicates with base station using a reverse link.

Simple radio communication networks transmitting data have now progressed to wireless systems transmitting voice or even video signals. As a result, the needs of users have also increased in terms of amount of data transmitted, bandwidth and power demands etc. Hence, despite the advances made in such communication systems, different aspects of these systems need to evolve further to address growing demands. This could involve improvements in various aspects such as quality of communications, power efficiency, optimal use of radio equipment, bandwidth etc.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A method of communication according to various aspects described herein provides for an AT that can transmit a CDMA data signal and is assigned a CDMA control sub-segment, along with other ATs that transmit OFDM data signals, and one or more CDMA traffic sub-segments for data transmission. A CDMA segment at each AP consists of multiple sub-segments, which may allocated in a predefined or dynamic way in time and/or frequency, configured by the network.

In an aspect, a three frame transmission time interval (TTI), with eight retransmissions is utilized for CDMA data transmission. The CDMA segment is defined so that it is transmitted over at least three PHY frames, e.g. a single packet is transmitted in portions over three PHY frames. In accordance with other aspects, a given H-ARQ transmission of CDMA data is spread over as many frames, e.g. out of the three that form the TTI, as are available. Further, an AP can also specify the interlaces at which a packet may begin during configuration for a specified AT.

In some aspects, auxiliary pilots may be transmitted in frames carrying data transmissions on the same bandwidth as the data transmission. In different aspects, the scrambling of a RL auxiliary pilot channel (R-AuxPich) can be a function of both the rate indication and the transmission index. This allows for the AT to signal changes in the rate for RL CDMA transmissions, with minimal overhead.

In another aspect, R-AuxPICH (Reverse Auxiliary Pilot Channel) is transmitted when CDMA data is present, and can be omitted by the AT for OFDM data transmission. Thus, the R-AuxPICH is used as a channel estimation pilot for CDMA transmissions as the AP. In various aspects, the power ratio of CDMA traffic to R-AuxPICH is fixed based on packet format. The ratio of R-AuxPICH to R-PICH can be varied based on ACK/NACK feedback. In accordance with different aspects this is achieved by setting a termination target, an up step-size and a down step-size during configuration.

In further aspects, a one-bit reverse link activity bit (RAB), which indicates whether loading (indicated by rise over thermal (RoT), or some other measurement) at a particular sector exceeds a predetermined threshold, can be used as an emergency load-control mechanism. This can be used to determine which flows are allowed to transmit data on the CDMA traffic segment in each PHY Frame. In a further aspect, the meaning of the RAB bit for each terminal can be set up during configuration.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
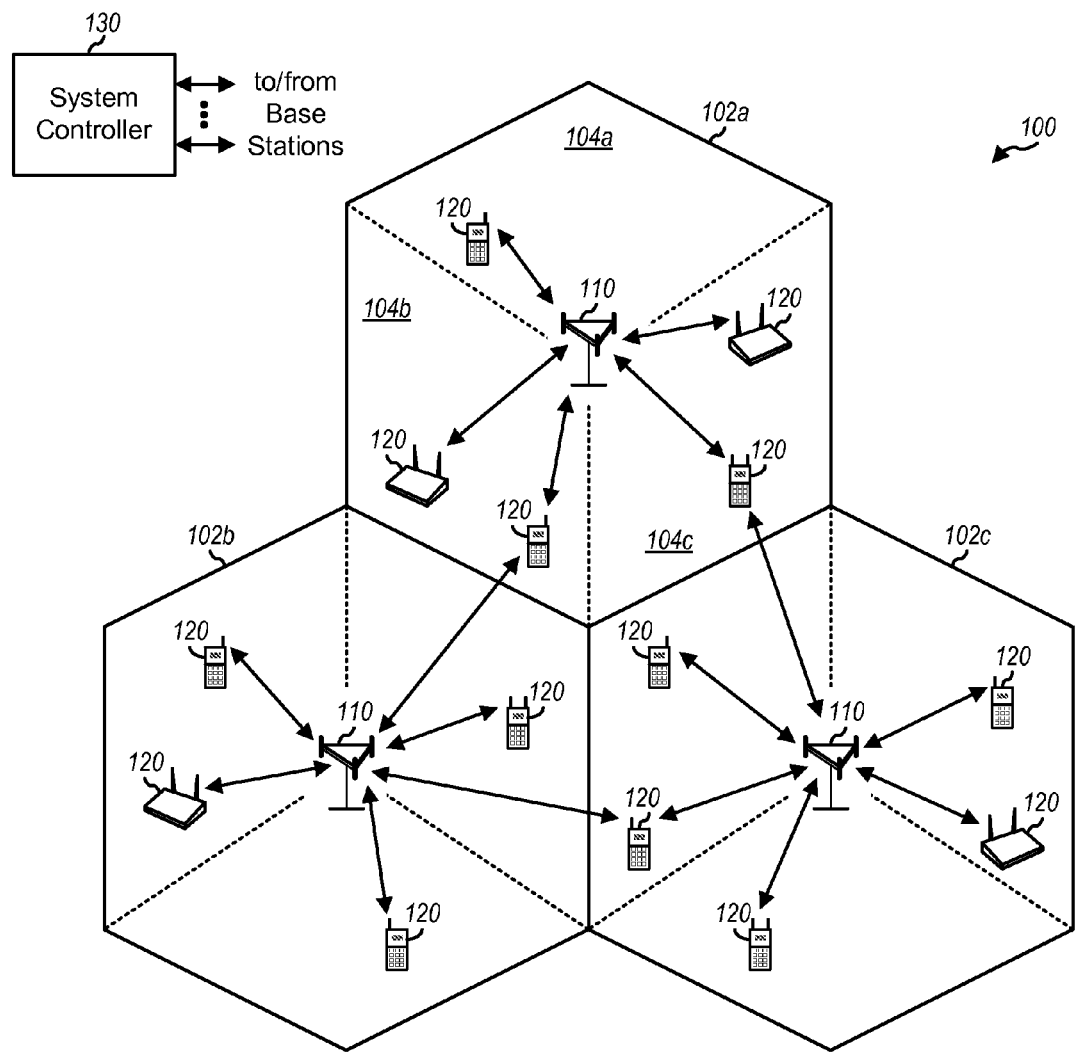
FIG. 1 illustrates a wireless multiple-access communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface. Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

FIG. 1 shows a wireless communication system 100 with multiple access points (APs) 110 and multiple terminals 120. A base station is a station that communicates with the terminals. A base station may also be called, and may contain some or all of the functionality of, an access point, a Node B, and/or some other network entity. Each access point 110 provides communication coverage for a particular geographic area 102. The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

In some aspects, the system may support multiple protocols such as CDMA and OFDMA, which may be used alternately for both RL and FL transmission, or for only one or the other. In addition, in OFDMA communication system one or more ATs may support a CDMA reverse link, along with or in lieu of an OFDM reverse link.

Figure 2:
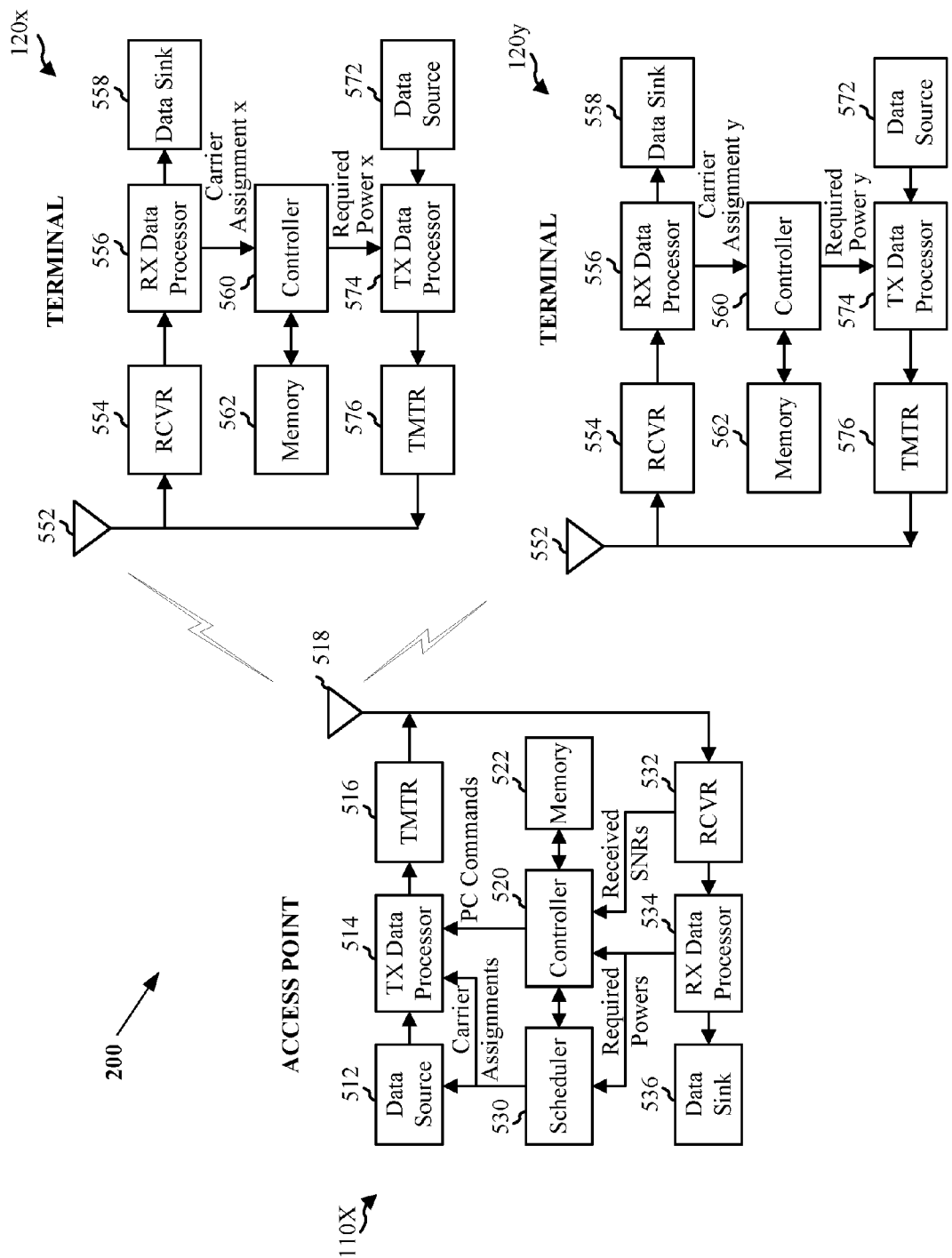
FIG. 2 shows a block diagram of an embodiment of an AP and two ATs in multiple-access multi-carrier communication system.

FIG. 2 shows a block diagram 200 of an embodiment of an AP 110x and two ATs 120x and 120y in multiple-access multi-carrier communication system 100. At AP 110x, a transmit (TX) data processor 514 receives traffic data (i.e., information bits) from a data source 512 and signaling and other information from a controller 520 and a scheduler 530. For example, controller 520 may provide power control (PC) commands that are used to adjust the transmit power of the active ATs, and scheduler 530 may provide assignments of carriers for the ATs. These various types of data may be sent on different transport channels. TX data processor 514 encodes and modulates the received data using multi-carrier modulation (e.g., OFDM) to provide modulated data (e.g., OFDM symbols). A transmitter unit (TMTR) 516 then processes the modulated data to generate a downlink modulated signal that is then transmitted from an antenna 518. Additionally, a memory 522 can maintain information regarding current or previous assignments and/or power levels.

At each of ATs 120x and 120y, the transmitted and modulated signal is received by an antenna 552 and provided to a receiver unit (RCVR) 554. Receiver unit 554 processes and digitizes the received signal to provide samples. A received (RX) data processor 556 then demodulates and decodes the samples to provide decoded data, which may include recovered traffic data, messages, signaling, and so on. The traffic data may be provided to a data sink 558, and the carrier assignment and PC commands sent for the terminal are provided to a controller 560. A memory 562 can be used to store the received maps and other information facilitating operation of the terminal. Controller 560 directs data transmission on the uplink using the resources that have been assigned to the terminal and indicated in the received assignment.

Controller 520 directs data transmission on the downlink using the resources that have been assigned to the terminal. Controller 520 further injects the erasure signature packets when the there is not actual data to transmit, yet desires to keep the assigned resources.

For each active terminal 120, a TX data processor 574 receives traffic data from a data source 572 and signaling and other information from controller 560. For example, controller 560 may provide information indicative of channel quality information, required transmit power, the maximum transmit power, or the difference between the maximum and required transmit powers for the terminal. The various types of data are coded and modulated by TX data processor 574 using the assigned carriers and further processed by a transmitter unit 576 to generate an uplink modulated signal that is then transmitted from antenna 552.

At AP 110x, the transmitted and modulated signals from the ATs are received by antenna 518, processed by a receiver unit 532, and demodulated and decoded by an RX data processor 534. The decoded signals can be provided to a data sink 536. Receiver unit 532 may estimate the received signal quality (e.g., the received signal-to-noise ratio (SNR)) for each terminal and provide this information to controller 520. Controller 520 may then derive the PC commands for each terminal such that the received signal quality for the terminal is maintained within an acceptable range. RX data processor 534 provides the recovered feedback information (e.g., the required transmit power) for each terminal to controller 520 and scheduler 530.

Scheduler 530 may provide an indication to controller 520 to maintain the resources. This indication is provided if more data is scheduled to be transmitted. For the AT 120x, the controller 560 may determine if resources required to be maintained. In certain aspects, controller 520 may perform instructions that provide the functionality of scheduler 530.

Figure 3:
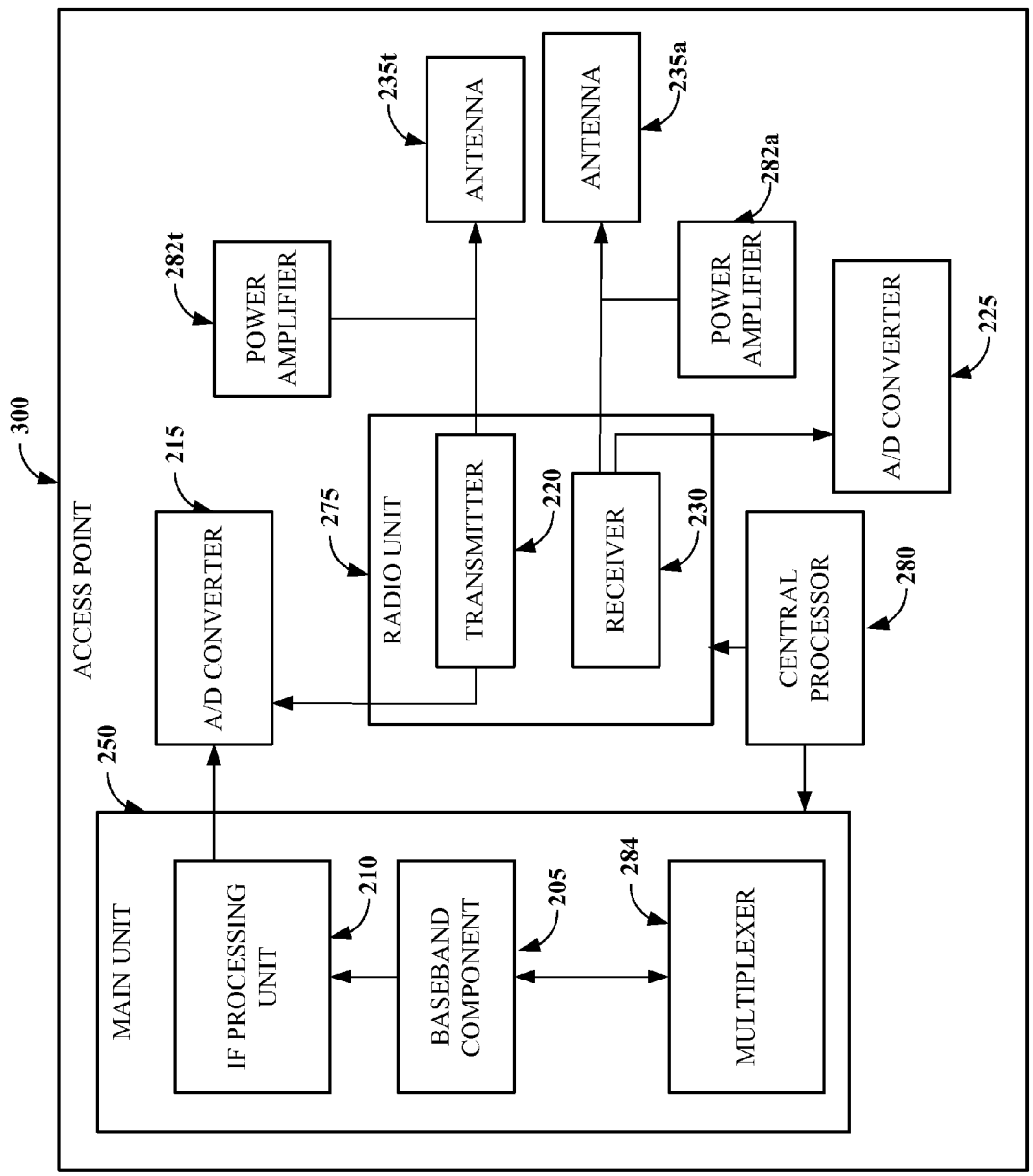
FIG. 3 shows a schematic diagram of an AP in accordance with an aspect.

As shown in FIG. 3, an access point 300 can comprise a main unit (MU) 250 and a radio unit (RU) 275. MU 250 includes the digital baseband components of an access point. For example, MU 250 can include a baseband component 205 and a digital intermediate frequency (IF) processing unit 210. Digital IF processing unit 210 digitally processes radio channel data at an intermediate frequency by performing such functions as filtering, channelizing, modulation, and so forth. RU 275 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 275 can include one or more receivers 230 connected to one more antennas 235a-t for receiving radio communications from mobile subscriber units. In an aspect, one or more power amplifiers 282 a-t are coupled to one or more antennas 235 a-t. Connected to receiver 230 is an analog-to-digital (A/D) converter 225. A/D converter 225 converts the analog radio communications received by receiver 230 into digital input for transmission to baseband component 205 via digital IF processing unit 210. RU 275 can also include one or more transmitters 220 connected to either the same or different antenna 235 for transmitting radio communications to access terminals. Connected to transmitter 220 is a digital-to-analog (D/A) converter 215. D/A converter 215 converts the digital communications received from baseband component 205 via digital IF processing unit 210 into analog output for transmission to the mobile subscriber units. In some embodiments, a multiplexer 284 for multiplexing of multiple-channel signals and multiplexing of a variety of signals including a voice signal and a data signal. A central processor 280 is coupled to main unit 250 and Radio Unit 275 for controlling various processing which includes the processing of voice or data signal.

Herein, one or more aspects of a wireless communication system design are described that support full & half duplex FDD (Frequency Division Duplex) and TDD (Time Division Duplex) modes of operation, with support for scalable bandwidth. However, this need not be the case, and other modes may also be supported, in addition to, or in lieu of, the previous modes. Further, it should be noted that the concepts and approaches herein, need not be used in conjunction with any other of the concepts or approaches described herein. Various aspects discussed herein, can also be associated with UMB (Ultra Mobile Broadband) which is a mobile OFDMA (Orthogonal Frequency Division Multiple Access) solution that provides mobile broadband services for various devices ranging from computing platforms to mobile handsets. It employs signaling and control mechanisms that facilitate advance techniques like MIMO etc. Hence, this technology can provide a mobile broadband experience substantially similar to broadband access associated with landline networks.

In an aspect, an AT that can transmit a CDMA data signal is assigned a CDMA control sub-segment, along with other ATs that transmit OFDM data signals, and one or more CDMA traffic sub-segments for data transmission. For example, in the UMB system, a CDMA sub-segment consists of a contiguous portion of the bandwidth in a frame, that occurs periodically every pre-determined number of PHY Frames. A single access terminal can be assigned one or more control sub-segments for the purpose of control channel transmission. These are known as CDMA control sub-segments. Additionally, an access terminal may also be assigned one or more CDMA sub-segments for the purpose of CDMA traffic transmission, which are known as CDMA traffic sub-segments. The set of CDMA sub-segments used for traffic may or may not be the same as the set of CDMA sub-segments used for control. Generally, a CDMA segment at each AP comprises multiple sub-segments, which may allocated in a predefined or dynamic way in time and/or frequency, configured by the network. A CDMA sub-segment assignment is flexible, it can be common across the network or portions of the network and same for all ATs, or allow for partial overlap across adjacent APs. Further, an AP is also allowed to have control sub-segments only (i.e., no traffic) for all ATs. The control sub-segment may be scheduled, or hop, over the traffic sub-segments of the OFDM reverse link. Further, in some aspects auxiliary pilots may be transmitted in frames carrying data transmissions on the same bandwidth as the data transmission. Data frames generally comprise a frame control field, address fields, frame body and a frame check sequence among other values.

In an aspect, CDMA reverse link (RL) data transmissions support automatic repeat request (ARQ) or hybrid automatic repeat request (H-ARQ) for retransmission of packets. ARQ is an error control method in data transmission wherein a receiver sends an acknowledgement to the transmitter to indicate proper reception of a data frame. Hybrid ARQ (H-ARQ) is a variation of the ARQ error control method, wherein error-detection information (such as cyclic redundancy check) and error correction code, for example, Turbo code, are encoded into the data block. When such an encoded data block is received, the error correction codes can be retrieved to correct transmission errors and obtain correct data frame. If all transmission errors are not corrected the receiver can request a retransmission in a manner similar to ARQ.

Figure 4A:
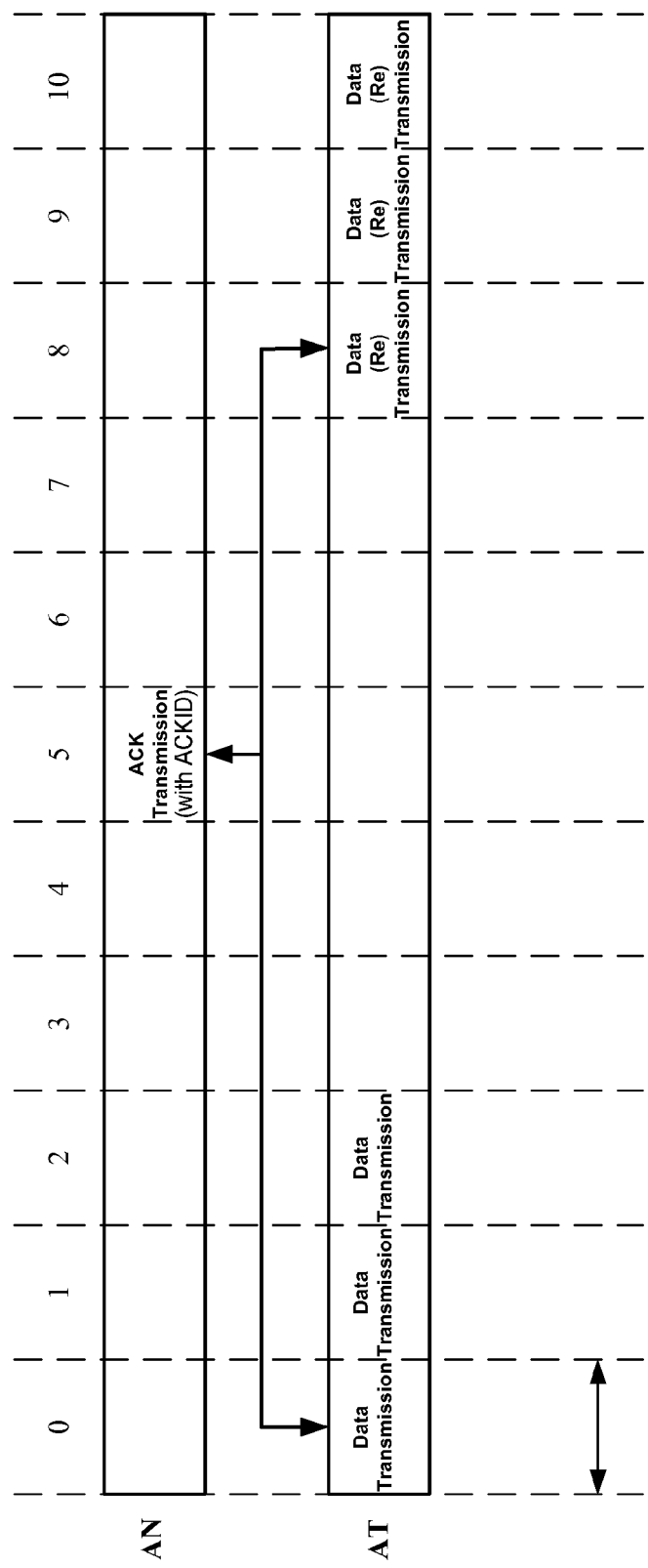
FIG. 4A illustrates a retransmission timeline for an H-ARQ interlacing structure in accordance with an aspect.

FIG. 4A illustrates a retransmission timeline for an H-ARQ interlacing structure in accordance with an aspect. Data transmission is generally organized in frames of fixed duration which can be referred to as a TTI (Transmission Time Interval). Each frame can be composed of a particular number of time slots. Generally, ATs within a cell may be synchronized at both frame and slot levels. To provide H-ARQ related processing time at the AN and AT, a three interlace structure can be used for both FL and RL. In accordance with an aspect, an interlace can comprise a set of frames such that each frame is spaced apart by seven PHY frames and each PHY frame comprises 8 OFDM symbols.

H-ARQ is generally implemented by forming a frame with transmission data encoded with error correction code and error detecting code. In accordance with an aspect, for CDMA data transmission, a one frame transmission time interval (TTI), with eight retransmissions is utilized. This may be the same as OFDM data transmitted on the same system. However, such an interlacing structure may lead to poor statistical multiplexing among users and link budget, which accounts for gains and losses from a transmitter, is bad. These drawbacks can be overcome by an interlacing structure that has packets split across a set of equi-spaced frames. Accordingly, a three frame TTI, with eight retransmissions can be utilized for data transmission as illustrated in FIG. 4A. In this aspect, the CDMA segment is defined so that it is transmitted over at least three PHY frames, e.g. a single packet is transmitted in portions over three PHY frames. In other aspects, a given H-ARQ transmission of CDMA data is spread over as many frames, e.g. out of the three that form the TTI, as are available. A scheduler may maintain granularity in allocation of CDMA traffic, while providing flexibility to improve statistical multiplexing as discussed herein.

Figure 4B:
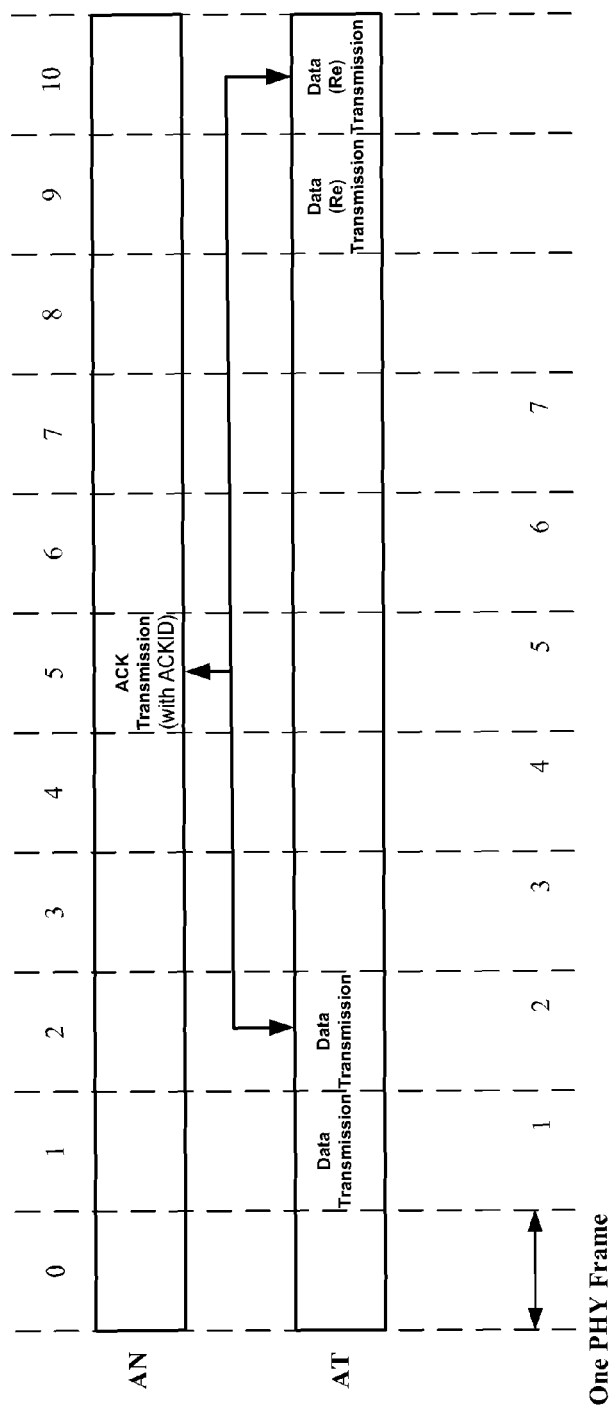
FIG. 4B shows an aspect wherein the AP specifies the interlaces to be used for CDMA data for an AT, and assigns a packet start interlace.

For a given AT the AP can specify the set of interlaces available for CDMA data. In addition, the AP can also specify the interlaces at which a packet may begin during configuration, via an assignment or other transmission. For example, there may be up to two interlaces per user allowed for CDMA data transmission. In accordance with the timeline illustrated in FIG. 4A, the AP specifies that interlaces 0, 1, and 2 are to be used for CDMA data (for this AT), and a packet transmission should begin in interlace 0 and span interlaces 0, 1 and 2. An ACK (acknowledgement) is transmitted from the AT to the AP at interlace 5 and subsequently data is repeated in retransmissions spanning interlaces 8, 9 and 10. FIG. 4B shows an aspect wherein the AP specifies that interlaces 1 and 2 are to be used for CDMA data (for this AT), and a packet start interlace of 0 is assigned. Therefore, the packet transmission spans interlaces 1 and 2. In general, an AP can specify two such "packet-start" interlaces. The two packet-start interlaces can be spaced apart by at least three frames. ACK (acknowledgement) resources are assigned to the AT corresponding to each interlace on which it can start a packet as shown in FIG. 4A and FIG. 4B. In general, for a start interlace of k, the AT's packet can span one or more interlaces k, k+1, and k+2 based on interlaces assigned to the AT for its CDMA traffic. Spreading over the three PHY frames provides improved statistical multiplexing among users as well as improving transmitter gains leading to better link budget for the same packet sizes. In addition, it provides flexibility to an AP to specify variable TTI sizes for different ATs based on various criteria, for example, bandwidth requirements.

Figure 4C:
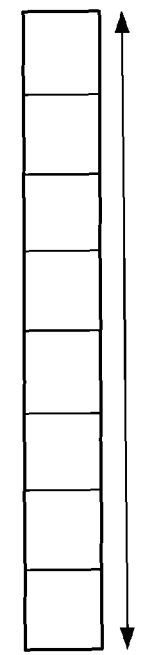
FIG. 4C shows a schematic diagram of example for a PHY frame used to transmit CDMA traffic data.

FIG. 4C shows an embodiment of a PHY frame used to transmit CDMA traffic data as described supra. In accordance with this aspect, each PHY frame is made up of 8 OFDM symbols.

Figure 5:
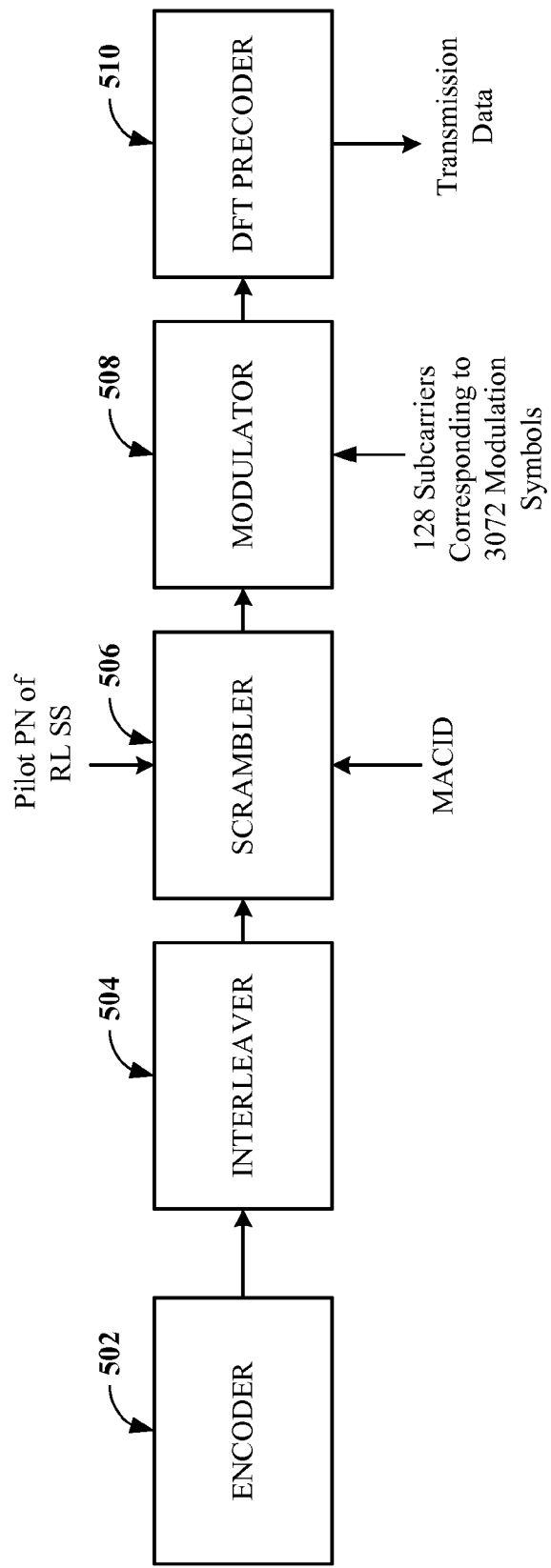
FIG. 5 is a schematic figure of an embodiment for transmitting data from an AT in accordance with an aspect.

FIG. 5 relates to an embodiment for transmitting data from an AT in accordance with an aspect. In this embodiment, encoder 502 encodes transmission data or information bits for CDMA traffic in a manner similar to OFDMA traffic, for example, by using a 1/5 turbo code. These encoded bits are interleaved by interleaver 504. In accordance with an aspect, the interleaver can be a pruned bit-reversal channel interleaver. A scrambler 506 scrambles the interleaved bits based on the users MACID and Pilot PN (Pseudo Noise) code of the RL serving sector. It is to be noted that this scrambling of CDMA traffic data is distinct from the scrambling of CDMA control data. Modulator 508 modulates the scrambled CDMA traffic data by employing, for example, QPSK (Quadrature phase-shift keying) modulation. The resulting symbols are mapped to the input of the DFT (Discrete Fourier Transform) precoder 510 for further preconditioning the modulated data prior to transmission. The number of modulation symbols per CDMA transmission depends on the bandwidth of the CDMA segment (or number of allocated CDMA sub-segments) as well as the number of frames in the interlace. For example, a 128 subcarrier CDMA segment over 3 PHY Frames corresponds to 3072 modulation symbols. Further, as in OFDMA traffic, repetition is used when the required number of modulation symbols corresponds to a code rate less than ⅕.

The packet formats on CDMA traffic segments, in accordance with an aspect, support voice-over internet protocol (VoIP) communication. In an aspect, VoIP support can be optimized by using two packet sizes, e.g. 256 and 128, these may be used to correspond to full-rate and quarter-rate enhanced variable rate CODEC (EVRC) frames respectively. The packet sizes may include MAC (Media Access Control) as well as cyclic redundancy codes (CRC) overheads. In addition, other types of flows (apart from VoIP) can be transmitted on this segment. The CDMA flow-mapping is determined by an AT using a distributed AT-centric CDMA MAC, or other mapping. Generally, an assignment indicates which flows are allowed on the CDMA traffic segment only, OFDMA traffic segment only, or both. However, the AT may determine this type of information based upon data type, e.g. flow ID, or other approaches. In an aspect, the packet format used for CDMA data transmission can be indicated through scrambling of a RL auxiliary pilot channel (R-AuxPich) which carries the auxiliary pilot to be used for data demodulation. This allows for the AT to signal changes in the rate for RL CDMA transmissions, with minimal overhead.

Figure 6:
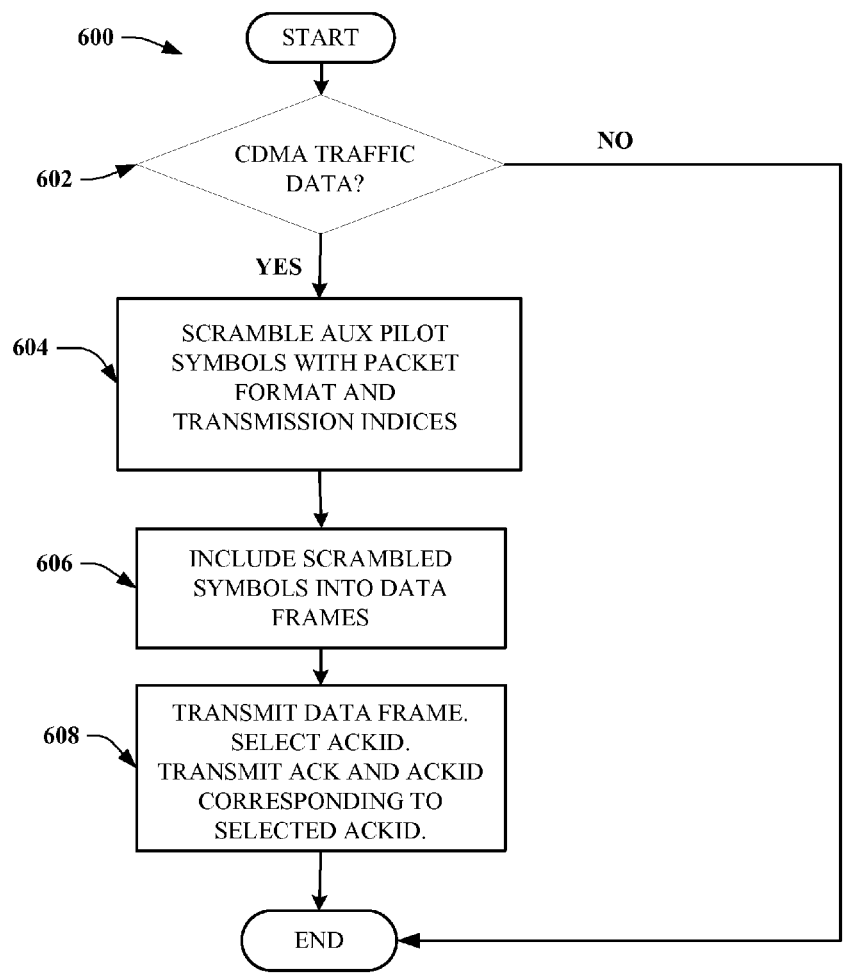
FIG. 6 shows a flow chart of a data transmission method which can be employed to mitigate the necessity for an RRI channel.

FIG. 6 shows a flow chart 600 that illustrates an aspect which can be employed to mitigate the necessity for an RRI channel as well as the need for multiple hypothesis demodulation/decoding. At 602, it is determined if the data to be transmitted is CDMA traffic data. If yes, the process moves on to step 604, else it reaches the end block. At 604, the auxiliary pilot symbols are scrambled based on the packet format to be transmitted as well as the retransmission index, the retransmission number of the current transmission. The retransmission number may be the number of the ARQ transmission that the current packet or packets represent. As stated supra, and as further illustrated in FIG. 6B infra, the auxiliary pilots are transmitted in frames carrying data transmissions. Hence, the scrambled symbols are included within frames carrying data at 606. Thus, pilot and data symbols in each frame undergo the same transmission processing and are transmitted at 608. Upon reception of these data frames, an AP can correlate the scrambling with different hypotheses to determine the packet format and transmission index prior to data demodulation. Further, for later transmissions on the CDMA channel, the AP can combine with the R-AuxPich (pilot) from previous transmission to identify one or more of packet format or transmission index.

In accordance with certain aspects, a Data Rate Control (DRC) channel carrying information regarding a transmission rate of data to be received in the forward direction is transmitted. Conversely, a Reverse Rate Indicator (RRI) channel carrying information about a traffic channel to be transmitted in the reverse direction is also transmitted to support high-speed data communication in the forward and reverse directions within the CDMA systems. The base station and the mobile station thus exchange the control information, thereby smoothly performing data communication. However, scrambling of R-AuxPich (pilot) based on packet format and retransmission index removes the need for a potentially expensive RRI channel and the need for multiple-hypothesis demodulation/decoding at the AP.

Figure 7:
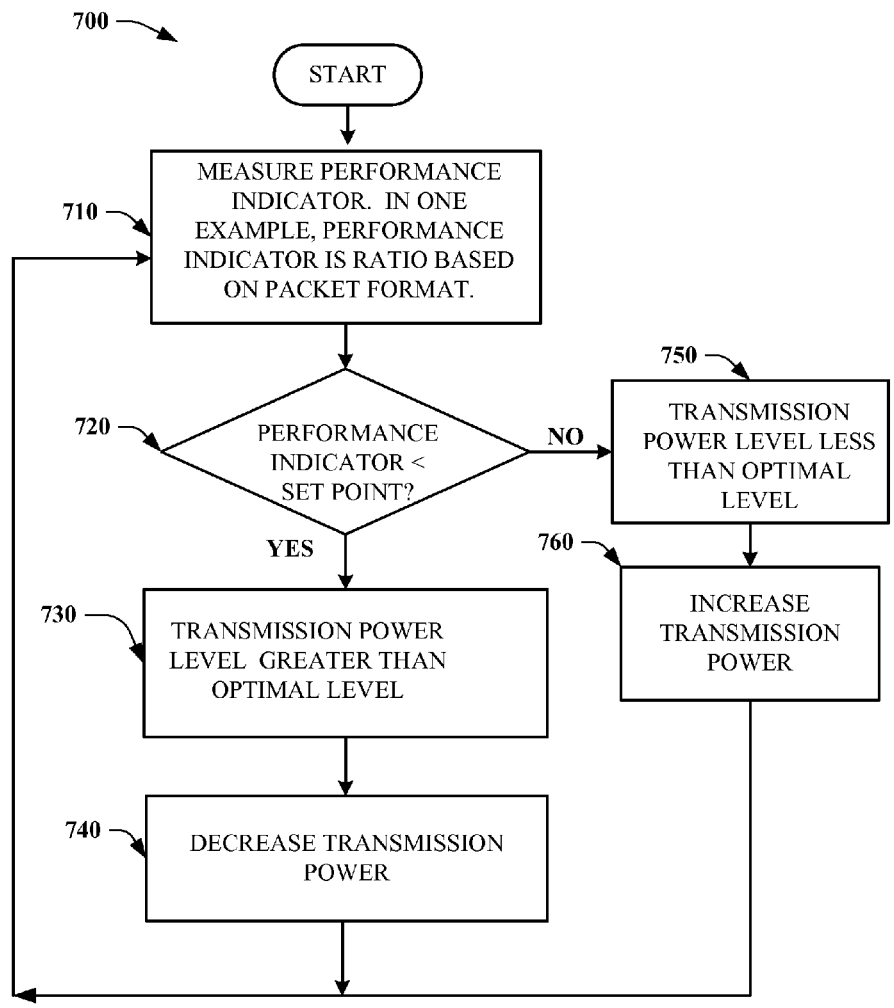
FIG. 7 is a flow chart that relates to another aspect providing power control loop for various reverse link channels within the communication system.

FIG. 7 is a flow chart that relates to another aspect providing power control loop for various reverse link channels within the communication system. The R-PICH is a channel that is spread by a CDMA code of all zeros and transmitted immediately before, as the access preamble by a mobile station that is transmitting an initial access message on an R-CCCH (Reverse Common Control Channel). The power control loop for R-PICH (Reverse link Pilot Channel) and the control channels are identical to the case when CDMA data is not present. F-PCCH, forward link power control channel is transmitted even when CDMA data is present. Thus, the F-PCCH is transmitted under different conditions for example, in the presence or absence of CDMA data even though it constitutes a small overhead as it ensures a tight received SNR set point for the pilot.

Within a communication system various metrics are used as performance rate indicators. SNR or signal-to-noise ratio of the received signal is one such metric. This can be employed in determining the transmission power level of an AT. Accordingly, at 710, a performance indicator is measured. At 720, the measured performance indicator is compared to a predetermined SNR set point in order to determine quality of communications. If the measured performance indicator is less than the set point, then it can be concluded at 730 that the associated AT is transmitting signals at a power level that is higher than what is optimally required. Accordingly, an AP transmits F-PCCH at 740 to facilitate decreasing the transmission power of the AT. This is accomplished via specifying the MACID of the AT associated with the received signal within the F-PCCH transmissions. On the contrary, if at 720, it is determined that the measured performance indicator is greater than the set point, then it is concluded at 750 that the associated AT is transmitting at a power level that is less than what is optimally required. Accordingly, at 760, the AP increases the transmission power level of the AT via an F-PCCH transmission which comprises the AT's MACID. The system continues to monitor the transmission power level of the AT at 710. Thus, F-PCCH carries up-down commands which control the level at which R-PICH is transmitted. This loop provides maintaining a received SNR set-point for the pilot. These power control signals are transmitted even when CDMA data is present thereby ensuring that power control loop for R-PICH and control channels remain unaffected by power control of CDMA data. The power control bits for R-PICH and control channels constitute a small signaling overhead, nevertheless, they facilitate in maintaining the SNRs of these channels which would otherwise fluctuate unnecessarily if they were to be power controlled based on ACK/NACKs for CDMA data. The SNR set point may also be used as a reference for setting control channel and data powers. ACK/NACK based power control is used to control the level at which CDMA data is transmitted, with respect to R-PICH.

Figure 8:
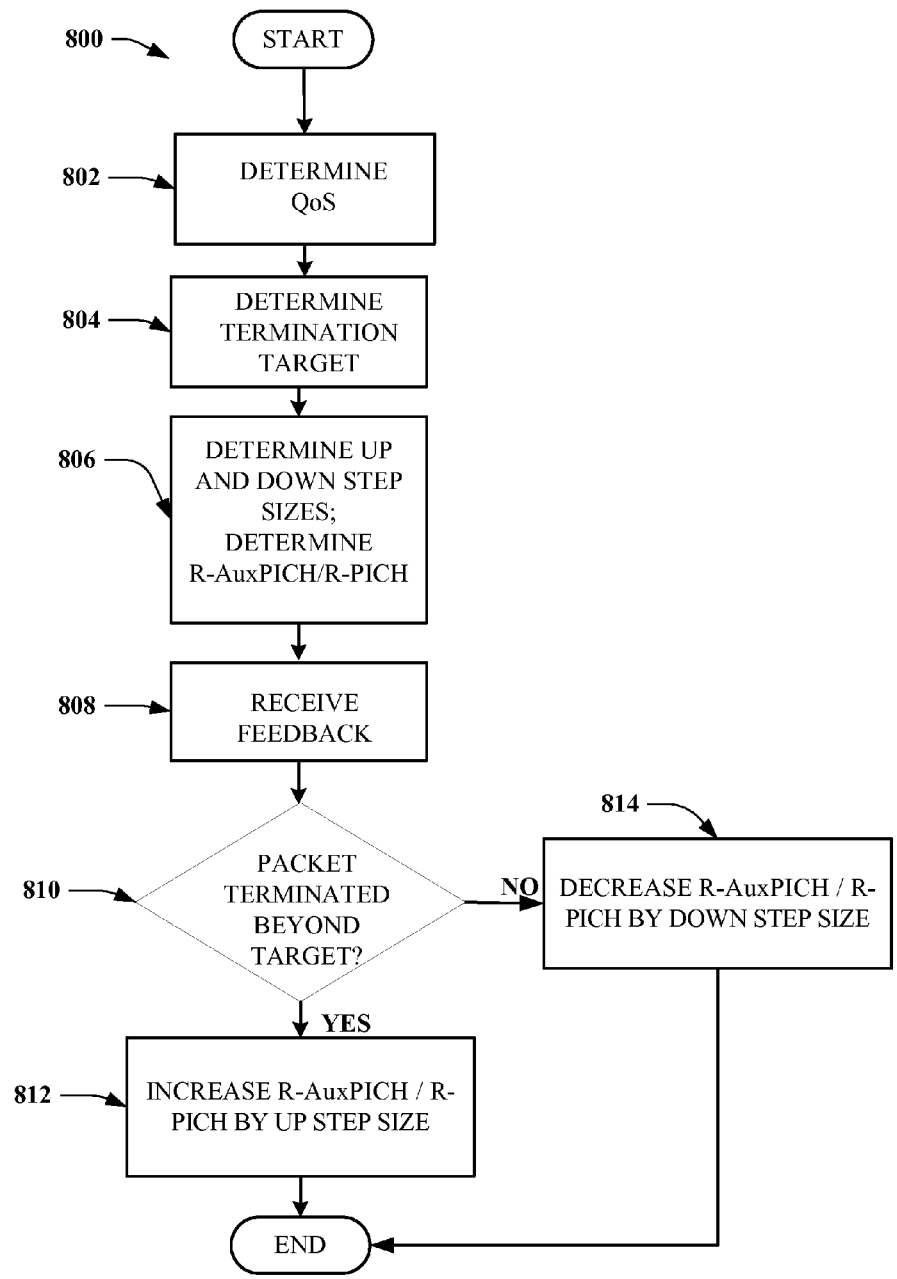
FIG. 8 relates to method 800 for setting power of various pilot channels within a communication system based on ACK/NACK feedback.

FIG. 8 relates to method 800 for setting power of various pilot channels within a communication system based on ACK/NACK feedback. The transmit power used is initially based on the power of the most recent successful access probe, and then is adjusted dynamically based on feedback received on the F-PCCH. As discussed, above R-AuxPICH is transmitted when CDMA data is present, and may be omitted by the AT for OFDM data transmission. The R-AuxPICH can be used as a channel estimation pilot for CDMA transmissions at the AP. R-PICH (Reverse Link broadband pilot channel) provides power control reference across the entire bandwidth. In one aspect, the power ratio of CDMA traffic to R-AuxPICH is fixed based on packet format. For example, the ratios for each packet format are set up during configuration of the communication session. The ratio of R-AuxPICH to R-PICH can be varied based on ACK/NACK feedback. An ACK is generally sent in response to a received transmission to indicate that the transmission was properly received. A NACK in response to a transmission indicates the transmission was not properly received. In response to an ACK, the transmitter transmits the next data whereas in response to a NACK, however, the transmitter retransmits the transmission that was not properly received.

Now turning to FIG. 8, at 802 the QoS flows carried in the packets are determined. The QoS of packets may vary depending on, for example, the type of data carried by the packets. The termination target for adjusting the power ratio of R-AuxPICH to R-PICH is determined next at 804. The up and down step sizes are determined at 806. The termination target as well as the up and down step sizes are determined for each packet based on the QoS of the flows carried in that packet. At 808, the feedback from transmitting the packet is received. At 810, the feedback is compared to the termination target to determine if the packet has terminated beyond the target. If yes, then at 812, the ratio R-AuxPICH/R-PICH is increased by the up-step size thereby increasing the transmission power of the R-AuxPICH and hence data. If the determination at 810 is negative then it concluded that the packet has terminated at or before its termination target. Hence, at 814 the R-AuxPICH/R-PICH ratio is decreased by the down step-size.

Figure 9:
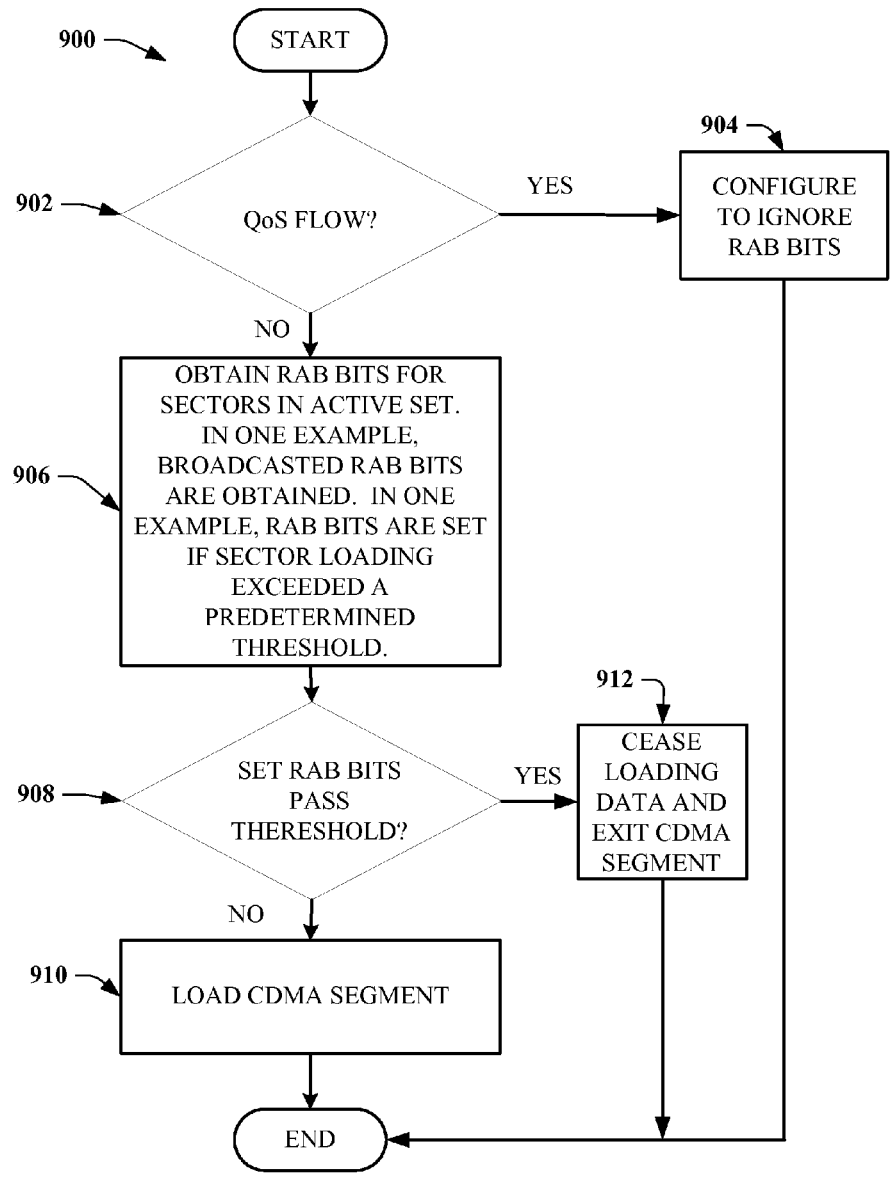
FIG. 9 illustrates a method which employs a one-bit reverse link activity bit (RAB) as an emergency load-control mechanism.

FIG. 9 is a flow chart that relates to another aspect associated with loading of the CDMA segment. This is generally controlled via admission control to the segment and/or AP which can also beneficially support QoS traffic like VoIP. FIG. 9 illustrates a method 900 which employs a one-bit reverse link activity bit (RAB) as an emergency load-control mechanism. The RAB bit indicates whether the loading (indicated by rise over thermal (RoT), or some other measurement) at a particular sector exceeds a predetermined threshold. This can be used to determine which flows are allowed to transmit data on the CDMA traffic segment in each PHY Frame. Accordingly, the meaning for RAB is set up initially during packet configuration. Hence, at 902, it is initially determined if the packets being configured are related to QoS flows like VoIP. If yes, then at 904, they are configured to ignore RAB bits which are broadcast and instead rely on admission control. If the configuration at 902 is not associated with QoS flow, the method proceeds to step 906 where RAB bits are obtained from each sector in the active set of the associated AT. At 908, the received RAB bits are compared with a threshold in order to identify if any of the bits which are set pass the threshold. If none of the bits pass the threshold, the process proceeds to 910 wherein the CDMA segment is loaded. However, if any of the RAB bits pass the threshold at 912, the non-QoS traffic is told to cease using the CDMA segment. To further utilize an RAB, a terminal listens for an RAB from each sector in its active set, subject to a threshold on RL quality (with respect to RL serving sector), if any of the received RAB bits that pass the threshold is set, terminal behaves as if it were set by RLSS. The RAB is an on-off keyed channel. In one aspect, an RAB in the ON state, uses only one of the 16 codewords used by the F-PQICH (pilot quality channel transmitted from the AP to the AT, indicating the quality of the RL pilot from the AT).

Acknowledgement bits may use the same modulation as that for OFDMA data to simplify AT RL processing. In an aspect, each user admitted to the CDMA segment is assigned an ACKID corresponding to each interlace at which a packet is allowed to start. This ACKID is applicable in the frame in which the ACK would be transmitted for that interlace, based on the decoding timeline specified in the framework. As discussed above, in an aspect, up to two packet-start interlaces, and hence up-to two ACKID's per user are assigned, e.g. during initial configuration of the communication session. In an aspect, a CDMA ACKID of 0 corresponds to the first ACK channel not assigned to OFDMA traffic. In another aspect, where the number of ACKs assigned to OFDMA traffic depends on the bandwidth available to ACK traffic, the ACKs assigned to the CDMA data is automatically reduced based on the bandwidth allocated to the CDMA segment.

As used herein, a segment or sub-segment may be a pre-defined time-frequency or frequency allocation, which may be contiguous or non-contiguous in time and/or frequency. Generally, the segment or sub-segment is a subset of the available allocation, with the rest of the allocation being used by OFDM data and control segments.

The data transmission techniques described herein may be implemented by various means. For example, these techniques may be implemented in hardware, firmware, software, or a combination thereof. For a hardware implementation, the processing units used for data transmission at a transmitter or data reception at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for data transmission from an access terminal, the method comprising:
   transmitting data via at least one CDMA data segment;
   transmitting an auxiliary pilot used for data demodulation via a pilot channel, wherein the auxiliary pilot is scrambled based on a packet format of the data to indicate the packet format used for transmitting the data; and
   transmitting control information via at least one CDMA control segment.

2. The method of claim 1, further comprising:
   scrambling the data transmitted via the at least one CDMA data segment according to a first scrambling sequence; and
   scrambling the control information transmitted via the at least one CDMA control segment according to a second scrambling sequence, that is different than the first scrambling sequence.

3. The method of claim 2, wherein the first scrambling sequence comprises a MACID of the access terminal and a PilotPN of a RL serving sector for the access terminal.

4. The method of claim 1, wherein the the pilot channel is an auxiliary pilot channel (R-AuxPich).

5. The method of claim 4, wherein the transmitting data comprises transmitting data via the at least one data segment at a power level offset from a power level of a transmission of the auxiliary pilot based upon a ratio determined by the packet format of the data.

6. The method of claim 4, wherein a ratio of the R-AuxPich to a reverse link pilot channel (R-PICH) is based upon a termination target, an up step-size and a downstep-size.

7. The method of claim 6, wherein the termination target, the up step-size and the down step-size are determined for each packet and are defined per QoS contained in a respective packet.

8. The method of claim 1, wherein the at least one CDMA data segment corresponds to at least some of 128 subcarriers of an OFDMA bandwidth.

9. An apparatus for data transmission from an access terminal comprising:
   means for transmitting data via at least one CDMA data segment;
   means for transmitting an auxiliary pilot used for data demodulation via a pilot channel, wherein the auxiliary pilot is scrambled based on a packet format of the data to indicate the packet format used for transmitting the data; and
   means for transmitting control information via at least one CDMA control segment, having bandwidth distinct from at least one CDMA data segment.

10. The apparatus of claim 9, further comprising:
    means for scrambling the data transmitted via the at least one CDMA data segment according to a first scrambling sequence; and
    means for scrambling the control information transmitted via the at least one CDMA control segment according to a second scrambling sequence, that is different than the first scrambling sequence.

11. The apparatus of claim 10 wherein the first scrambling sequence comprises a MACID of the access terminal and a PilotPN of a RL serving sector for the access terminal.

12. The apparatus of claim 9, wherein the pilot channel is an auxiliary pilot channel.

13. The apparatus of claim 12, wherein the means for transmitting data comprises means for transmitting data via the at least one data segment at a power level offset from a power level of a transmission of the auxiliary pilot based upon a ratio determined by the packet format of the data.

14. The apparatus of claim 13 wherein the ratio is based upon a termination target, an up step-size and a down step-size.

15. The apparatus of claim 14 wherein the termination target, the up step-size and the down step-size are defined per QoS class supported by the access terminal.

16. The apparatus of claim 9 wherein the at least one CDMA data segment corresponds to at least a portion of 128 subcarriers of an OFDMA bandwidth.

17. A computer program product embodied on a non-transitory computer-readable storage medium and comprising codes that, when executed, causes a computer to perform the following:
    transmit data via at least one CDMA data segment;
    transmit an auxiliary pilot used for data demodulation via a pilot channel, wherein the auxiliary pilot is scrambled based on a packet format of the data to indicate the packet format used for transmitting the data; and
    transmit control information via at least one CDMA control segment.

18. The computer program product of claim 17 wherein the non-transitory computer-readable medium further comprising codes, which when executed, causes the computer to perform the following:
    scramble the data transmitted via the at least one CDMA data segment according to a first scrambling sequence; and
    scramble the control information transmitted via the at least one CDMA control segment according to a second scrambling sequence, that is different than the first scrambling sequence.

19. The computer program product of claim 17 wherein the at least one CDMA data segment corresponds to at least a portion of 128 subcarriers of an OFDMA bandwidth.

20. The computer program product of claim 17, wherein the non-transitory computer-readable medium further comprising codes, which when executed, causes the computer to perform the following:
    spread a given hybrid automatic repeat request (H-ARQ) transmission of CDMA data over as many frames as are available out of three frames that form a TTI (Transmission Time Interval).

* * * * *